D. T. & D. C. IGOU.
PAPER FEEDING DEVICE FOR WRAPPING MACHINES.
APPLICATION FILED MAY 4, 1915.
1,173,276.
Patented Feb. 29, 1916
5 SHEETS—SHEET 3.
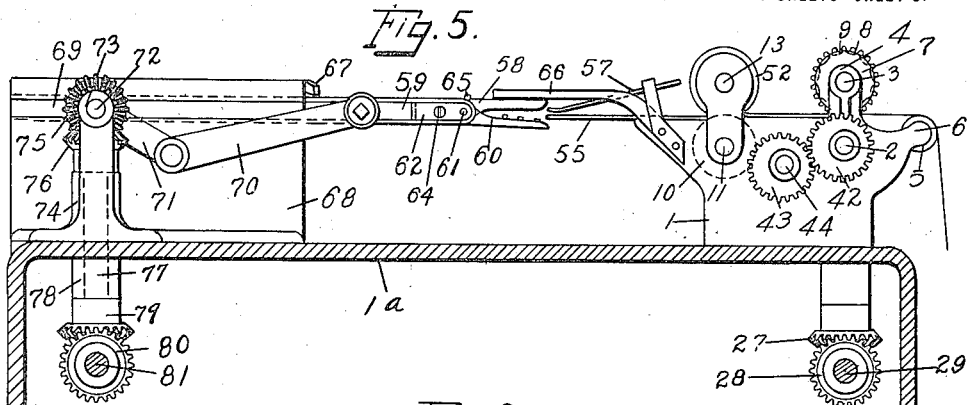
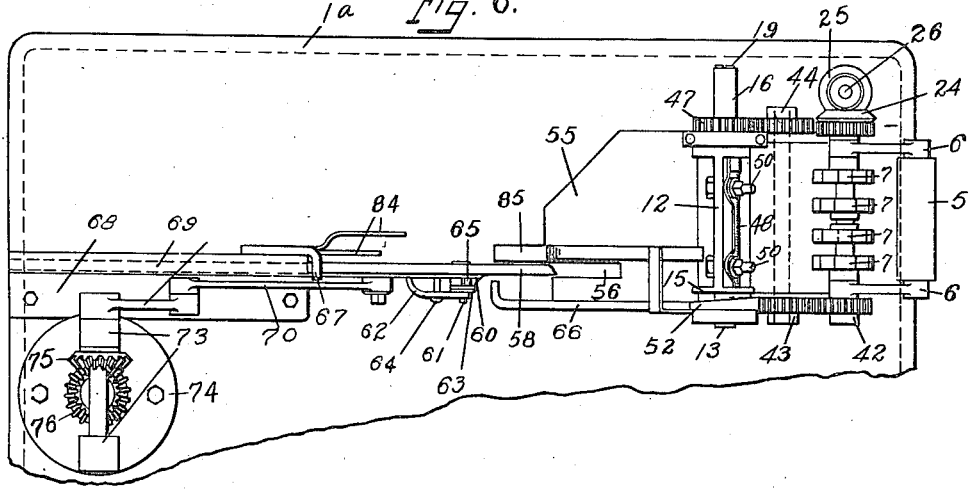
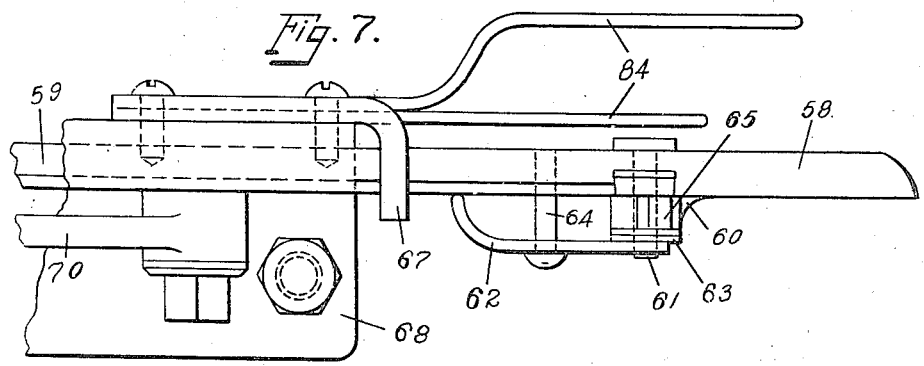

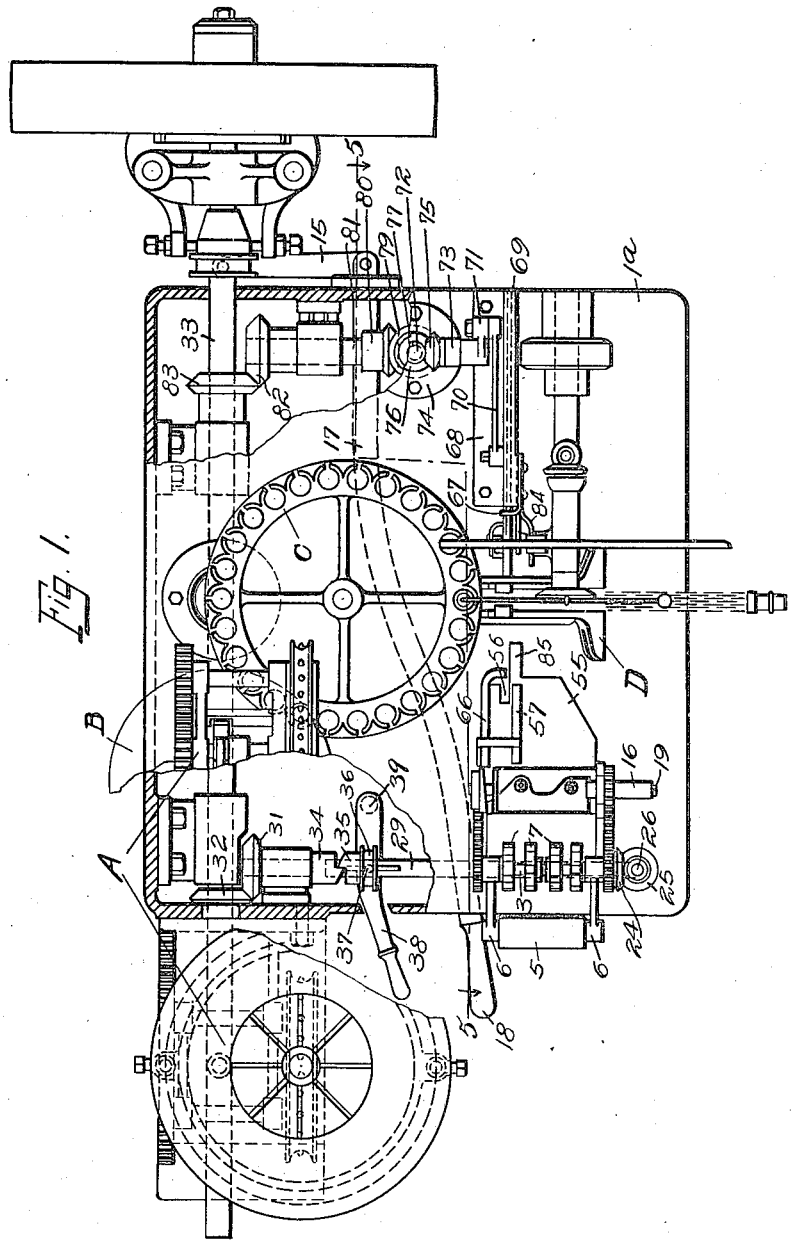

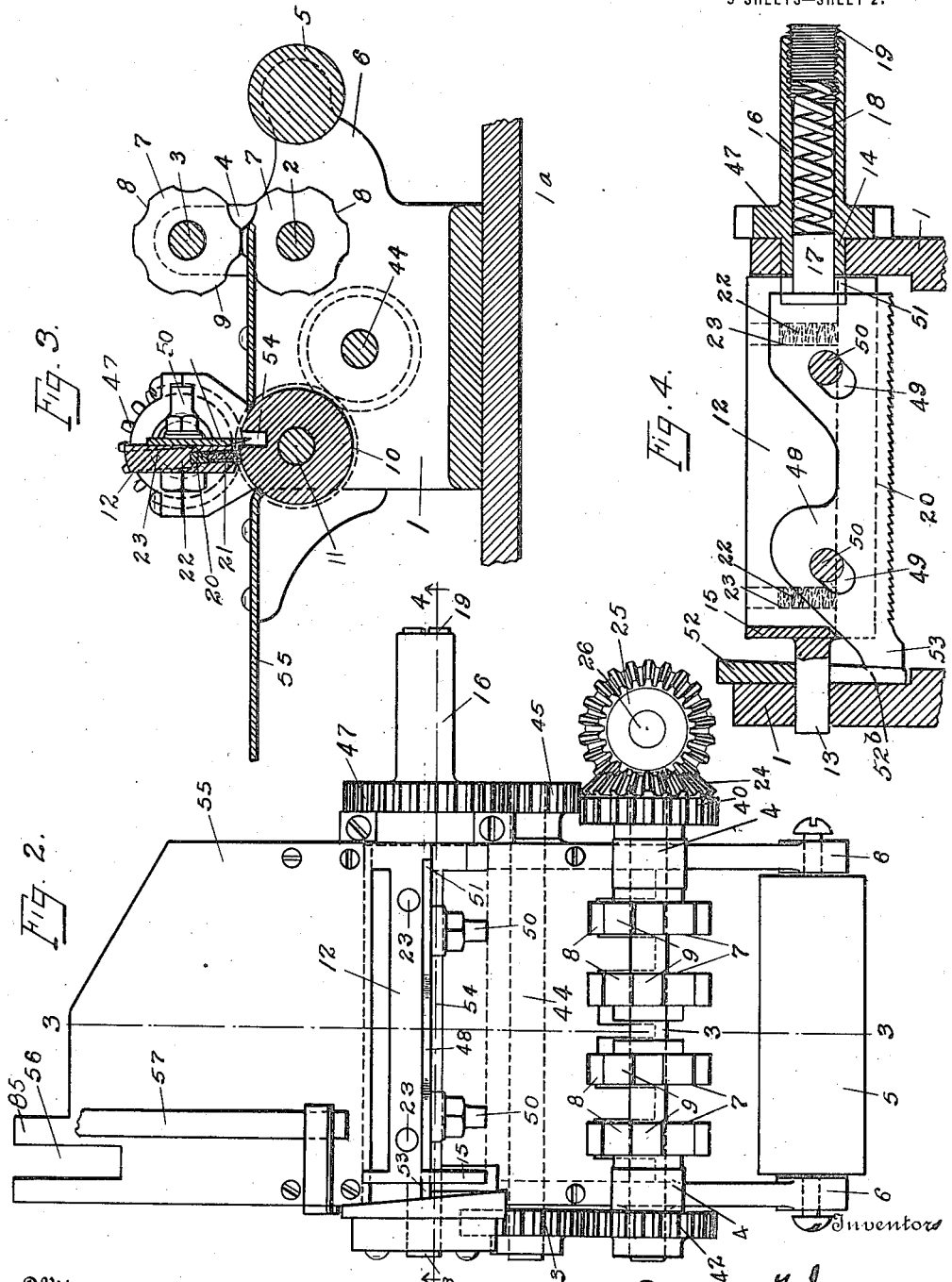

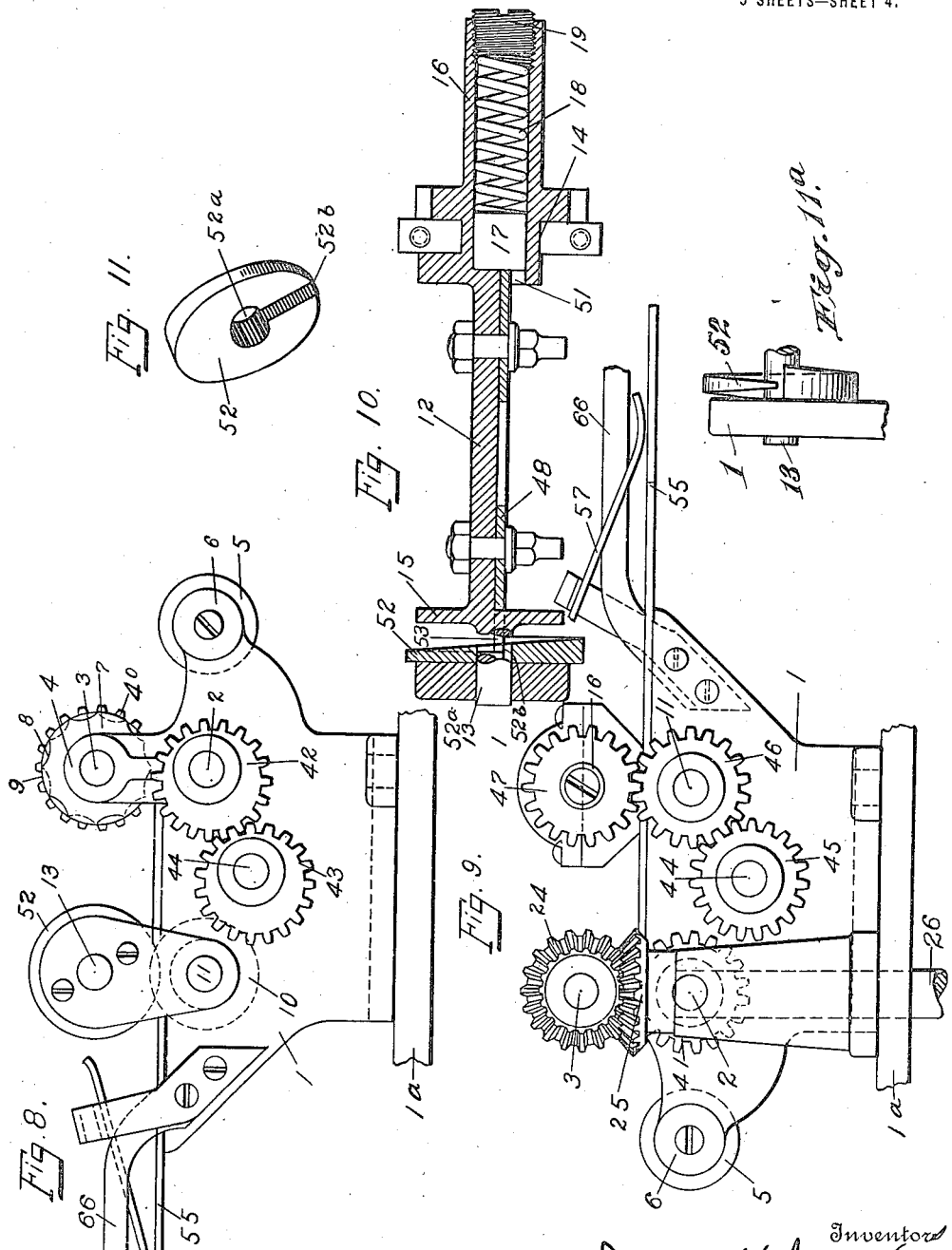

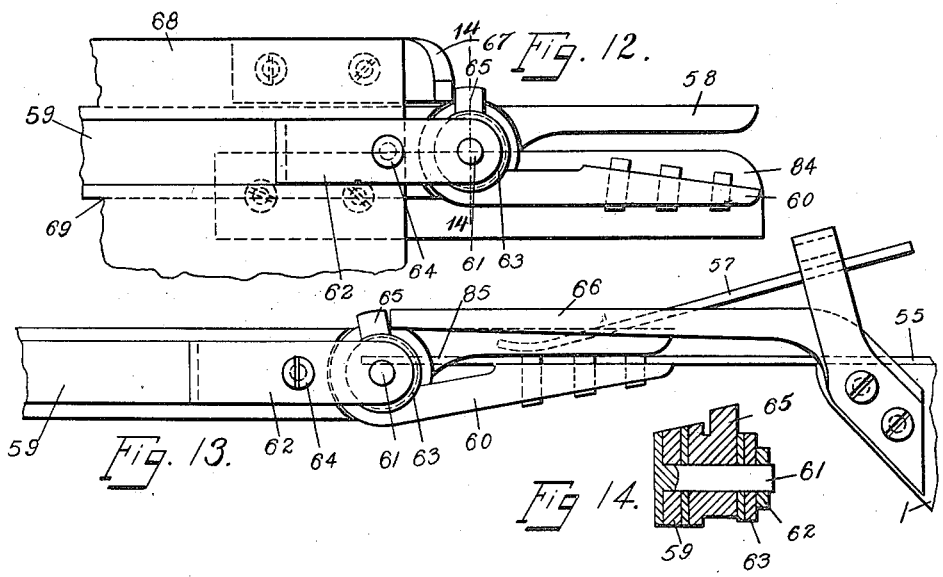

UNITED STATES PATENT OFFICE.

DENNIS T. IGOU AND DALE C. IGOU, OF SPRINGFIELD, OHIO, ASSIGNORS TO THE IGOU MANUFACTURING COMPANY, OF SPRINGFIELD, OHIO, A CORPORATION OF OHIO.

PAPER-FEEDING DEVICE FOR WRAPPING-MACHINES.

1,173,276.   Specification of Letters Patent.   Patented Feb. 29, 1916.

Original application filed September 19, 1910, Serial No. 582,671. Divided and this application filed May 4, 1915. Serial No. 25,698.

*To all whom it may concern:*

Be it known that we, DENNIS T. IGOU and DALE C. IGOU, citizens of the United States, residing at Springfield, in the county of Clark and State of Ohio, have invented certain new and useful Improvements in Paper-Feeding Devices for Wrapping-Machines, of which the following is a specification.

This invention relates to improvements in machines for wrapping candy and more particularly to that part of the machine which feeds the paper wrappers to a position to receive the confections; this application being a division of our pending application Ser. No. 582,671, filed September 19, 1910.

The object of the invention is to provide a mechanism of the character referred to, which will be simple in construction and effective in operation.

In the accompanying drawings:—Figure 1 is a top plan view of so much of the machine employing our improved devices as is necessary to illustrate the operation of the same, and a portion of the same being broken away. Fig. 2 is a top plan view of the feeding and cutting mechanism. Fig. 3 is a vertical sectional view taken on the line 3—3 of Fig. 2. Fig. 4 is a transverse sectional view taken on the line 4—4 of Fig. 2 and looking in the direction of the arrows. Fig. 5 is a vertical section taken on the line 5—5 of Fig. 1, some of the parts, however, being omitted. Fig. 6 is a top plan view of the feeding, cutting and gripping devices. Fig. 7 is an enlarged plan view in detail of the gripping devices. Fig. 8 is a side elevation of the feeding and cutting devices. Fig. 9 is a side elevation of the feeding and cutting devices on the opposite side of the same from that shown in Fig. 8. Fig. 10 is a horizontal section view of a portion of the cutting mechanism. Fig. 11 is a perspective view in detail of part of the cutting mechanism. Fig. 11ª is a bottom plan view of the cam shown in Fig. 11 and its supporting standard, the cam being shown in its normal position. Fig. 12 is a detail view of the paper gripping jaws in their open position. Fig. 13 is a similar view showing the jaws in their closed position. Fig. 14 is a sectional detail view taken on the line 14—14 of Fig. 12.

Like parts are represented by similar characters of references in the several views.

In the accompanying drawings A represents a portion of the reducing and feeding mechanism, which mechanism draws the bar into a suitable and uniform diameter and feeds this bar to a cutting device B, which divides the same into small parts or confections, which mechanism is described in our prior application referred to and is also fully described in an application filed by us May 4th, 1915, Ser. No. 25,698. The confections are then delivered to a carrier C, which deposits them on the wrappers, which wrappers have been fed to the wrapping mechanism D by the devices which form the subject matter of this application and which will now be described; the wrapping mechanism in itself forming no part of these devices and being described more fully in our pending application, Ser. No. 582,671. These devices comprise a frame consisting of two parallel side members 1 between which are mounted two shafts 2 and 3. The lower shaft 2 is journaled in the body of the side walls of the frame, while the upper shaft is journaled in upwardly extending arms 4 rigidly secured to these side walls. The shafts are preferably arranged in substantially the same vertical plane and each has mounted thereon a feed roller.

The web of paper from which the wrappers are to be formed is carried from the roll, which is supported beneath the frame, upward and over the guide roller 5 supported by arms 6 forming a part of the frame members 1 and is presented to the feed rollers in a substantially horizontal plane. In the form shown each feed roller comprises a series of friction disks 7, there being, in the present instance, four of such disks on each shaft. Each disk has a series of recesses or cut away portions 8 formed therein at equal distances about the periphery thereof. Those portions of the disk lying between the recesses 8 constitute feeding projections 9 and the corresponding disks on the two shafts are mounted in substantially the same vertical planes and are so arranged that the feeding projections of the disks will grip the paper between them and feed the same forward so long as they are in engagement therewith. The projections will release the paper before the succeeding pair of projections will grip the same. Consequently, there is an interval when the paper is not acted upon by that particular pair of disks. The series of disks on each shaft are arranged alternately, i. e., the feeding projections on one disk are in the same radial planes as the recesses of the adjacent disk. Consequently, the disks of one pair will grip the paper at the instant it is released by the disk of another pair. In this manner the paper is fed forward continuously, but the points of contact of the feeding disks or rollers with the paper are constantly changing and furthermore are narrow and widely separated. By reason of this arrangement whereby the paper is alternately gripped and released by the several pairs of disks, the paper will tend of its own accord to return to its true course should it have been slightly diverted therefrom.

To accomplish the return of the paper to its normal path in a positive manner, should it be diverted therefrom, we have arranged a pair of gripping devices in a position to engage the web of paper after it passes the feeding rollers and to move the same at a slightly higher speed than it is moved by the feeding rollers, thereby exerting a pull on that portion of the web which lies between the feeding rollers and the gripping devices and tending to draw the web of paper into a straight line. These gripping devices, as here shown, comprise a roller 10 mounted on a shaft 11 journaled in the side members 1 of the frame. Arranged immediately above the roller 10 is a bar 12 arranged parallel with the roller and extending at right-angles to the path of the web of paper. This bar is provided at its opposite ends with trunnions 13 and 14, which are journaled in the frame members 1. The trunnion 13 is of ordinary construction and is rigidly secured to a disk or flange 15, which, in turn, is rigidly secured to the end of the bar 12, these parts being preferably formed integral. The trunnion 14 is hollow and extends for some distance beyond the side of the frame member 1 in the form of a sleeve 16 and has slidably mounted therein a plunger 17 which is held normally in its innermost position by means of a spring 18 confined between the plunger and the closure for the end of the sleeve, which, in the present instance, comprises a screw-threaded plug 19. The bar 12 has a suitable friction member arranged along one edge thereof and adapted to engage the paper on the roller 10 and exert a gripping action thereof. This friction member, in the present instance, consists of a strip of rigid material 20, slidably mounted in the bar 12 and having a piece of leather or other suitable material inserted in the lower edge thereof, as indicated at 21. Springs 22 arranged in recesses 23 in the bar 12 bear against the inner edge of the strip 20 and tend to move the strip outwardly.

The feeding rollers and the gripping devices may be actuated in any suitable manner. In the present instance the upper shaft 3 of the feeding rollers has mounted on one end thereof a bevel gear 24 which meshes with a corresponding gear 25 secured to the upper end of a shaft 26 which extends downward through the top 1ª of the main frame and has on its lower end a bevel pinion 27 meshing with a bevel pinion 28 carried by a shaft 29 arranged longitudinally of the frame and supported in bearings carried by the frame. The rear end of this shaft has a bevel gear 31 meshing with a bevel gear 32 on a main driving shaft 33. The bevel gear 31 is preferably loosely connected to that shaft by suitable clutch mechanism. In the present instance the bevel gear 31 is rigidly secured to a sleeve 34 into which the adjacent end of the shaft 29 projects. One end of the sleeve 34 forms a clutch member adapted to coöperate with a second clutch member 35 slidably mounted on the shaft 29 and held against rotation relative thereto. The clutch member 35 has an annular groove 36 adapted to receive a pin 37 carried by a lever 38 which is pivotally mounted on the under side of the top 1ª of the main frame at 39 and extends beyond the side of the main frame to form a handle by means of which the clutch mechanism may be actuated to control the rotation of the shaft 29, and thereby start or stop the paper feeding mechanism. The shaft 3 also has rigidly secured thereto a gear 40 which meshes with a corresponding gear 41 secured to the lower shaft 2, thereby causing the two shafts and the feeding rollers carried thereby to be rotated in opposite directions. The lower shaft 2 has a gear 42 eccentrically mounted on the end thereof opposite the gear 41 and this eccentrically mounted gear meshes with a second eccentrically mounted gear 43 carried by a shaft 44 journaled in the side members 1 and having on its opposite end a gear 45, which gear meshes with a gear 46 on the shaft 11 of the roller 10, and this gear, in turn, meshes with a gear 47 which is mounted on and rigidly secured to the sleeve-like trunnion 14 of the rotatable bar 12. The eccentric gears 42 and 43 are so arranged that the shaft 44 will move slowly during a portion of its rotation and during another portion of its rotation will move at a higher rate of speed. The gears are so arranged that the speed of the shaft 44, and, consequently, of the roller 10 and bar 12, is increased at the time of their contact with the paper and this increased speed is greater than the speed of the feeding rollers. Consequently, the paper between the feeding rollers, and the bar will be drawn taut, and, inasmuch as the bar 12 and roller 10 are at right angles to the line of movement of the paper, the tendency will be to correct any variation of the web of paper from its true course of travel, this being permitted by the narrow and widely separated points of contact between the feeding rollers of disks and the paper.

The cutting device for dividing the web of paper into sheets or wrappers may be of any suitable character and we have here shown the same as comprising a blade 48 movably mounted on the bar 12 and adapted to engage the paper in the rear of that bar while the paper is stretched taut. To this end the blade is provided with inclined slots 49 through which extend pins or bolts 50 carried by the bar 12. The trunnion 14 which supports one end of the bar 12 has an opening 51 therein to receive the adjacent end of the blade 48 and permit the same to be engaged by the spring-pressed plunger 17, which plunger tends to move the blade longitudinally of the bar 12, and, owing to the inclination of the slots 49, its movement is also a downward movement. The movement of the blade is limited by a cam plate 52 which is secured to that frame member 1 opposite the spring-pressed plunger 17. This cam plate is in the form of a metallic ring surrounding the trunnion 13 and has its two extremes of thickness arranged adjacent one to the other at the lowermost point of movement of the bar; this ring having a central opening 52$^a$ and being split radially at that point where the high and low parts thereof meet, as indicated at 52$^b$ (Fig. 11).

The cam plate is engaged by a projection 53 extending from the adjacent end of the blade 48. As the bar 12 revolves the blade 48 will be moved laterally against the pressure of the spring-pressed plunger 17 until the bar and the blade reach the lowermost point of their movement when the projection 53 will pass off the end of the cam plate and the plunger will move the blade transversely and downwardly into engagement with the paper; the radial slit in the cam permitting the low part thereof to spring slightly as this operation takes place so as to obviate shock and jar on the parts; the cam being so formed that the lower part thereof will stand a suitable distance away from the support 1 to permit this yielding movement. At the time of the operation of the blade 48 the paper is held by the friction member 20 and roller 10 and has been drawn taut over a slot 54 formed in the roller 10 and so arranged as to be in the line of movement of the blade 48 at the time of its operation. The transverse and downward movement of the blade gives it a shearing action and this combined with the stretching of the paper over the slot 54 causes the paper to be severed with a smooth clean cut. The action of the friction member 20 and the roller 10 also serves to prevent the paper from adhering to the blade and thus having its forward movement interfered with. The severed sheet of paper is delivered by the friction member and roller upon a supporting plate 55 having near one corner thereof a slot 56 above which the edge of the paper extends. A finger 57 acts as a guide to prevent the paper curling up or blowing off the table.

A pair of gripping jaws, mounted to move transversely to the machine as a whole, grip the sheet of paper while it is on the supporting plate 55 and transfer the same to the wrapping mechanism. These gripping jaws comprise an upper jaw 58 rigidly secured to a slide bar 59 and a lower jaw 60 pivotally mounted on that slide bar. The movable jaw 60 is connected to the fixed jaw by suitable friction devices which, in the present instance, comprise a pivot pin 61, smooth throughout its length and extending through the two jaws. A spring plate 62 has one end extending about the end of the pivot pin 61 and bearing against a washer 63. The opposite end of the plate is curved inward toward the slide bar 59 and is held in position by a screw 64. By tightening down this screw the end of the plate which surrounds the pivot may be caused to exert the desired amount of pressure on the washer 63 and on the jaw 60. In this manner sufficient friction is exerted on the movable jaw 60 to hold the same against movement by gravity. The movement of the lower jaw is accomplished by means of a projection or lug 65 extending upwardly therefrom and preferably at a point immediately above its pivotal center. As the jaws move forwardly, i. e., toward the sheet of paper on the supporting plate 55, they are in their open position and receive the edge of the paper between them. As the jaws approach the limit of their forward movement a stop, such as a finger 66 rigidly secured to one of the side members 1 of the paper feeding and cutting devices, engages the lug 65 of the movable jaw and moves that jaw about its pivotal center, causing it to grip the paper between itself and the upper jaw. The frictional resistance to the movement of the lower jaw retains it in its gripping position as the slide bar carrying the jaws is retracted. As the jaws approach their rearmost position, in which position the sheet of paper or wrapper rests upon the wrapping mechanism in the proper position to receive the confection, the lug 65 will be engaged by a stop or finger 67 carried by the bracket 68 rigidly secured to the top 1$^a$ of the main frame. This stop or finger moves the lower jaw about its pivotal center and releases the sheet of paper or wrapper therefrom.

In order that the gripping action of the jaws may be increased and that a slight separating of the jaws may not release the paper the jaws are provided with resilient contact members. In the form here shown the movable jaw has mounted therein a series of soft rubber plugs, the ends of which extend beyond the face of jaw. When the jaw is moved into its closed position the resilient members engage the paper, are compressed between the jaws and exert a strong gripping action on the paper. If the jaws should separate slightly from any cause these members will expand and still press the paper against the fixed jaw, thereby preventing it from escaping from between the jaws as would follow if the gripping faces were not yieldable. The movement of these jaws may be accomplished in any suitable manner. In the present instance the slide bar 59 is mounted in a guideway 69 formed in the bracket 68. A pitman 70 is pivotally connected at one end to the slide bar and at its other end to a crank arm 71 secured to one end of a shaft 72 journaled in horizontal bearings 73 carried by a bracket 74 mounted on the top 1ᵃ of the main frame. This shaft has secured thereto a bevel pinion 75 meshing with a corresponding pinion 76 secured to the upper end of a vertical shaft 77 which is mounted in a bearing 78 carried by the top 1ᵃ of the main frame and has its lower end extending beneath the top of the frame and provided with a bevel pinion 79 meshing with a beveled gear 80 on the shaft 81, which shaft is driven from the main driving shaft 33 through the medium of the beveled gears 82 and 83. Supporting fingers 84 and 85 extend from the bracket 68 and the plate 55, respectively, to points near the wrapping mechanism and serve to support the outer edges of the wrapper when it is in position upon said mechanism.

Having thus described our invention, we claim:

1. In a machine of the character described, a wrapper-forming device comprising paper feeding rollers, gripping devices arranged beyond said paper feeding rollers, means for actuating said paper gripping devices, while they are in engagement with said paper being fed by said feeding rollers, at a greater rate of speed than said feeding rollers are actuated, and a cutter arranged to engage the paper between said paper feeding rollers and said gripping devices.

2. In a machine of the character described, a wrapper-forming device comprising a pair of feeding rollers, each having a series of disks spaced apart thereon and arranged in sets, the corresponding disks on the two rollers being arranged to coöperate one with the other, said disks having paper-engaging surfaces spaced about the periphery thereof, one set of disks alternating with the other set in gripping and releasing the paper, paper gripping devices arranged beyond said feeding rollers and comprising a roller, and a rotatable bar having a friction member arranged at one edge thereof and adapted to engage the paper while it is in engagement with said roller, and means for accelerating the speed of said gripping devices.

3. In a machine of the character described, a wrapper-forming device comprising a pair of feeding rollers, each consisting of a shaft having a series of disks spaced apart thereon and arranged in sets the corresponding disks of the two rollers being arranged to coöperate one with the other, said disks having paper-engaging surfaces spaced about the periphery thereof, one set of disks alternating with the other set in gripping and releasing the paper, paper gripping devices arranged beyond said feeding rollers and comprising a roller, a rotatable bar having a friction member arranged at one edge thereof and adapted to engage the paper while it is in engagement with said roller, means for accelerating the speed of said gripping devices, and a cutter carried by said bar and adapted to engage the paper in the rear of the friction member.

4. In a machine of the character described, a wrapper-forming device comprising a pair of feed rollers, each of said rollers consisting of a plurality of disks arranged in sets, each disk having a series of projections spaced about the periphery thereof, one set of disks on each roller coöperating with the corresponding set of disks on the other roller and alternating with the other corresponding sets of disks on said rollers in gripping and releasing the wrappers.

5. In a machine of the character described, a wrapper-forming device comprising a pair of feed rollers, each of said rollers consisting of a plurality of disks arranged in sets, each disk having a series of projections spaced about the periphery thereof, one set of disks alternating with the other set in gripping and releasing the wrappers, gripping devices arranged beyond said feeding rollers and comprising a roller, a rotatable bar arranged parallel with said roller and having a fixed member secured to one edge thereof, and eccentrically mounted gears for rotating said roller and said rotatable bar.

6. In a machine of the character described, a wrapper-forming device comprising a pair of feed rollers, each of said rollers consisting of a plurality of disks, arranged in sets, each disk having a series of projections spaced about the periphery thereof, one set of disks alternating with the other set in gripping and releasing, gripping devices arranged beyond said feeding rollers and comprising a roller, a rotatable bar arranged parallel with said roller and having a fixed member secured to one edge thereof, eccentrically mounted gears for rotating said roller and said rotatable bar, a knife movably mounted on said rotatable bar, and means controlled by the rotation of said bar for actuating said knife.

7. In a machine of the character described, a wrapper-forming device comprising a pair of feeding rollers, gripping devices arranged beyond said feeding rollers and comprising a roller having a longitudinal slot therein, a bar rotatably mounted above said roller and having a friction member secured to one edge thereof, a hollow trunnion secured to one end of said bar, a blade slidably mounted on said rotatable bar and adapted to move diagonally thereto, a spring-pressed plunger mounted in said hollow trunnion adapted to engage one end of said blade, and a cam plate arranged to engage the opposite edge of said blade and move the same diagonally to said bar and against the action of said spring-pressed plunger.

8. In a machine of the character described, a wrapper-forming device comprising a pair of feeding rollers, gripping devices arranged beyond said feeding rollers and comprising a roller having a longitudinal slot therein, a bar rotatably mounted above said roller and having a friction member secured to one edge thereof, a hollow trunnion secured to one end of said bar, a blade slidably mounted on said rotatable bar and adapted to move diagonally thereto, and a spring-pressed plunger mounted on said hollow trunnion and adapted to engage one end of said blade, a cam plate arranged to engage the opposite edge of said blade and move the same diagonally to said bar and against the action of said spring-pressed plunger, and resilient means for cushioning said blade as it rides off the high part of said cam plate.

9. In a machine of the character described, a pair of gripping jaws comprising a fixed jaw, a movable jaw, friction means for retaining said movable jaw in its adjusted position relative to the fixed jaw, a part carried by said movable jaw, and stops secured to fixed parts of said machine to engage the part carried by said movable jaw and move said jaw into its open and closed positions, respectively.

10. In a machine of the character described, a bracket having a guideway, a slide bar mounted in said guideway, means for causing said slide bar to reciprocate in said guideway, a jaw rigidly secured to one end of said slide bar, a second jaw pivotally mounted on said slide bar and adapted to coöperate with the fixed jaw, a lug secured to said pivoted jaw, and fingers secured to fixed parts of said machine near the opposite limits of movement of said jaws and adapted to engage said lug to move said pivoted jaw into its open and closed positions, respectively.

11. In a machine of the character described, a bracket having a guideway, a slide bar mounted in said guide-way, means for causing said slide bar to reciprocate in said guideway, a jaw rigidly secured to one end of said slide bar, a second jaw pivotally mounted on said slide bar and adapted to coöperate with the fixed jaw, a spring plate adjustably secured to said slide bar and having one end bearing against said pivoted jaw to exert a frictional resistance to the movement thereof, a lug secured to said pivoted jaw, and fingers secured to fixed parts of said machine near the opposite limits of movement of said jaws and adapted to engage said lug to move said pivoted jaw into its open and closed positions respectively.

12. In a machine of the character described, a paper feeding mechanism comprising feeding devices, a rotatable spring-pressed cutting knife, and a stationary metallic cam plate for throwing said bar in inoperative position and permitting the same to be thrown to operative position, said cam plate having a radial slit at the end of the high part thereof, whereby the low part thereof will form a resilient cushion for said knife.

13. In a machine of the character described, a wrapper forming device comprising paper feeding rollers, a cutter for severing the paper together with means for operating the same, and gripping devices arranged beyond said paper feeding rollers together with means for actuating the same while in engagement with the paper at a greater rate of speed than said feeding rollers are actuated and before the severing operation by said cutter.

14. In a machine of the character described, a wrapper forming device comprising paper feeding rollers, a cutter for severing the paper, gripping devices arranged beyond said rollers, means for actuating said gripping devices while in engagement with the paper at a greater rate of speed than said feeding rollers are actuated, and means for operating said cutting mechanism after the beginning of and during the gripping action of said gripping devices.

15. In a machine of the character described, a wrapper forming device comprising paper feeding rollers, a cutter for severing the paper, gripping devices arranged beyond said paper feeding rollers comprising a roller and revoluble bar coöperating therewith to engage the paper at each revolution of the same, means for operating said bar and roller at a greater speed than that of said feeding rollers while the same are in engagement with said paper, and means for operating said cutter after the beginning of and during the gripping action of said gripping devices.

In testimony whereof, we have hereunto set our hands this 24th day of April, 1915.

DENNIS T. IGOU.
DALE C. IGOU.

Witness:
CHAS. I. WELCH.